United States Patent Office 3,307,243
Patented Mar. 7, 1967

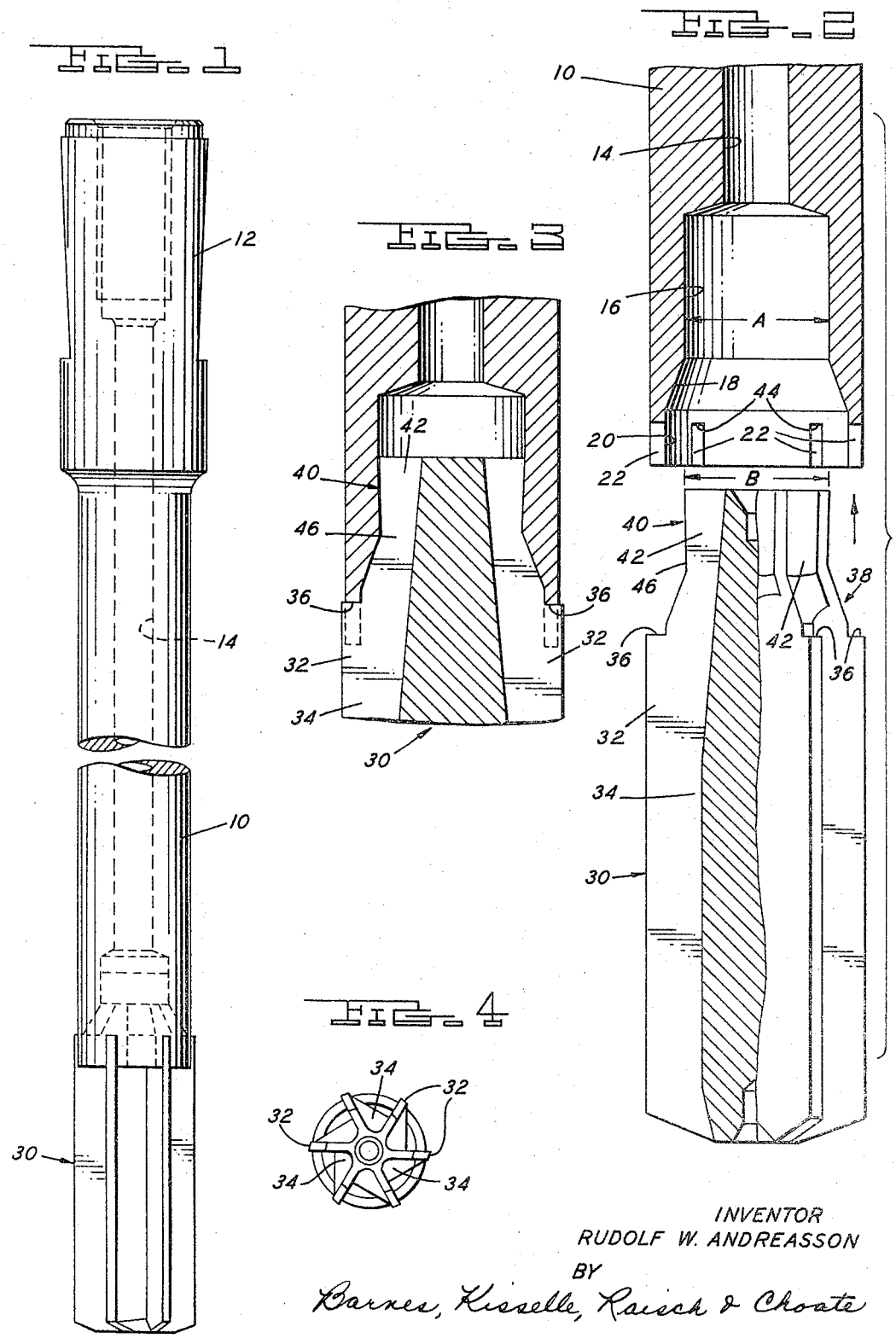

3,307,243
ROTARY TOOL
Rudolf W. Andreasson, 780 W. Maple Road,
Birmingham, Mich. 48009
Filed Dec. 21, 1964, Ser. No. 419,665
4 Claims. (Cl. 29—106)

This invention relates to a rotary tool such as a drill or reamer and more particularly to that type of tool wherein a driving shank has fastened to the operating end thereof a drill bit of harder material than the shank as, for example, tungsten carbide.

Reference is made to co-pending application Serial No. 206,972, filed July 2, 1962, now Patent No. 3,169,417, dated February 16, 1965.

In the field of metal cutting, it has been common in the past few years to utilize cutting edges which are formed by inserts that can be replaceable. In large dimension boring tools or milling cutters, this is a relatively simple matter but in smaller dimension drills and reamers, it has been the practice to utilize a carbide cutting bit on the end of a shank by brazing it in such a manner that by reheating the assembly the insert can be removed and replaced. Brazing, however, requires a heating of both parts to a temperature of 1100 to 1200° F. and it frequently happens that this heating and subsequent cooling will set up a strain in the carbide which will cause checking and cracking sometimes to the point that the entire insert must be discarded. Brazing also may interfere with coolant passages in drills and reamers.

It is an object of the present invention, therefore, to obtain this union between the shank and the more expensive and disposable cutting insert without the necessity of brazing. In the present invention, the use of a shrink fit with a particular construction lends itself to utilizing the principles of a shrink fit to obtain a positive junction and a positive torque drive. The heating for such a fit can be accomplished at about 800 to 900° F. and the heating can be accomplished on the shank alone so that when the insert is assembled, it has to absorb only the heat of the shank by conduction which is not destructive.

Other objects and features of the invention include details of the design to obtain a most effective union and drive.

Drawings accompany the disclosure and the various views thereof may be briefly described as:

FIGURE 1, an assembly view of a shank and reamer bit.

FIGURE 2, an enlarged view showing the parts prior to assembly.

FIGURE 3, an enlarged view showing the parts in section after assembly.

FIGURE 4, an end view of the assembled parts.

Referring to the drawings:

The invention is illustrated in connection with a reamer of the type utilizing a hollow tube drive shank for carrying coolant which discharges at the working end around the cutting insert. The driving shank 10 has an end 12 for insertion into a suitable machine where driving torque is provided along with a supply of coolant, there being a central passage 14 in the shank for carrying coolant to the working end. The end of the shank has an enlarged recess 16 co-axial with the coolant passage 14, this recess 16 enlarging in a tapered portion 18 to terminate at a cylindrical portion providing a cylindrical skirt 20 which is slotted to provide circumferentially spaced openings 22.

A cutting insert 30 formed of a hard cutting material such as tungsten carbide has a plurality of lands 32 separated by flute portions 34. The lands have a shoulder 36 at the top end thereof and are so dimensioned that they are snugly received in the slots 22 of the skirt shank end 20. Above the lands 36 on the insert 30 is a tapered portion 38 which leads to a substantially cylindrical portion 40. In order to provide coolant flow from the inner passage of the shank, the flutes 34 are carried upwardly through the walls of the portions 38 and 40 in grooves 42 in a manner similar to the construction shown in copending application Serial No. 206,972, now Patent No. 3,169,417.

In the construction of the parts thus far described, there are certain dimensions that are important. The dimension A of the recess 16, for example, is smaller than the dimension B of the substantially cylindrical extension 40 of the insert 30. In other words, the walls of the recess 16 will not receive the projection 40 when the parts are at normal room temperatures because of the dimensions. The difference between these dimensions may be approximately .004 to .005" at normal room temperatures for a reamer having a diameter of about 1". For smaller or larger size tools, these dimensions are readily ascertainable.

In assembly, the insert end of the shank 10 is heated in an induction loop or otherwise by standard methods to a temperature of approximately 800 to 900° F. At this temperature, the dimension A will expand by approximately .007" and with this expansion it is possible readily to insert the cutting bit into the recess 16 in such a manner that the walls telescope together and the shank end of the lands 32 will axially insert into the slots 22, the shoulders 36 engaging with the inner end 44 of the slots. The insert can be at room temperature during this assembly operation; and as the parts are cooled, the shank will shrink around the inserted portion of the insert to form a tight engagement with it. It has been found that if the contraction upon cooling is about 40 percent of the total expansion prior to assembly, the union between the parts will be secure.

It may be desirable to put a slight back taper on the portion 40 as shown best in FIGURES 2 and 3 so that there will be slightly more contraction at 46 than at the outer end of the insert, thus providing an axial lock.

It will be seen that during this assembly, the only heat to which the tungsten carbide insert is subjected is the heat of conduction which will follow the assembly, and this will not raise the temperature of the insert materially. Thus, heat damage to the insert during assembly is avoided. Furthermore, since no brazing material or flux is needed, it is no longer a problem to keep the coolant passages open.

It has been found that a union of the parts obtained in this way is extremely secure and that even when the parts are heated together simultaneously to such heats as they might be subjected in a working operation the junction of the parts is not disturbed. The tapered portion 38, together with the tapered recess 18, serve to center the parts and align them for proper concentricity and straightness. The interlocked skirt portion 20 and lands 32 provide torque drive between the parts.

I claim:

1. In a coolant carrying rotary tool of the type using a driving shank and a co-axial bit on the working end thereof,
    (a) an elongate bit having a flute and land configuration in cross-section between a cutting end and a shank end, the shank end having a portion with walls shaped to engage with a hollow driving shank,
    (b) a hollow driving shank having at the bit end a skirt portion to engage axially in a flute of a bit, and a recess portion having walls shaped to receive and engage the shank end of the bit, the inner dimension of said walls of said shank being smaller than the outer dimension of the walls of said bit to the degree that said shank can be heated to expand to receive the shank end of the bit with the skirt portion of the shank engaged in a flute of the bit and cooled to grip said bit in a tight radial and axial bond, said flute having communication with the interior of said hollow shank in a passage at the surface of one of said walls.

2. A rotary tool as defined in claim 1 in which the portion of the bit shaped to engage in a recess of the shank has a back taper such that the dimension of the inserted portion of the bit at the end extending furtherest into the shank recess is slightly greater than the dimension of the portion axially spaced from said end in the area of contact with the recess of the shank.

3. A rotary tool as defined in claim 1 in which the contraction of the shank around the bit upon cooling is approximately 40 percent of the expansion during assembly.

4. A rotary tool as defined in claim 1 in which a portion of the recess in said shank is substantially cylindrical in shape, and a portion of the bit to enter said recess is substantially cylindrical, and there is formed in said recess and on said bit a tapered section flaring from said cylindrical portion having inner and outer walls respectively to engage upon assembly of said parts to center and align said shank and bit.

References Cited by the Examiner
UNITED STATES PATENTS

| | | | |
|---|---|---|---|
| 991,884 | 5/1911 | Osgood | 77—71 |
| 2,852,962 | 9/1958 | Fibish. | |
| 3,169,417 | 2/1965 | Andresson | 77—65 |

FOREIGN PATENTS

| | | |
|---|---|---|
| 5,471 | 1912 | Great Britain. |
| 53,632 | 10/1910 | Switzerland. |

WILLIAM W. DYER, JR., *Primary Examiner.*

HARRISON L. HINSON, *Examiner.*